April 12, 1932. W. L. SMITH, JR 1,853,783
KNITTING MACHINE
Filed April 28, 1925 13 Sheets-Sheet 1

Inventor
William L. Smith, Jr.
By C. W. Bradford
Attorney

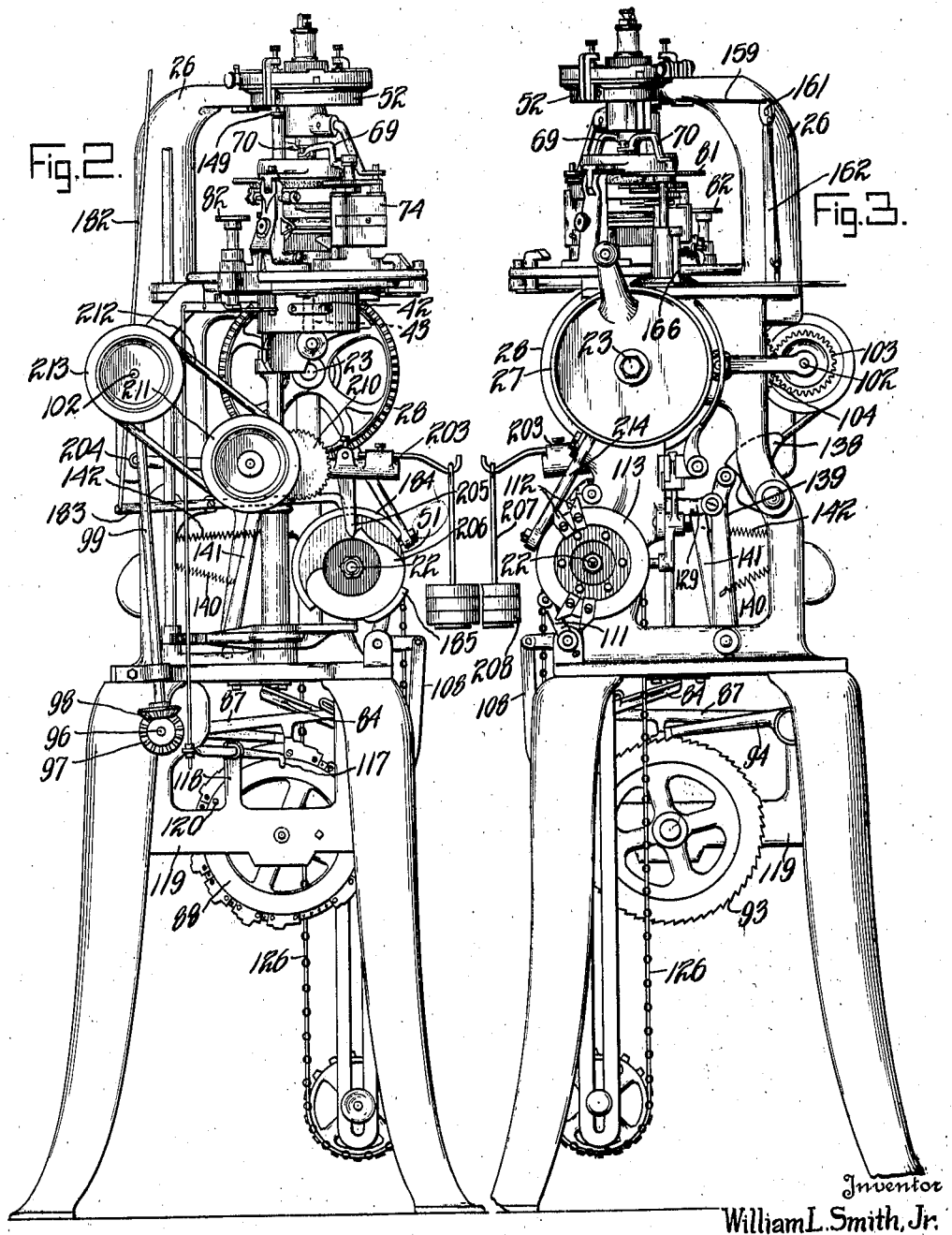

April 12, 1932.  W. L. SMITH, JR  1,853,783
KNITTING MACHINE
Filed April 28, 1925   13 Sheets-Sheet 4
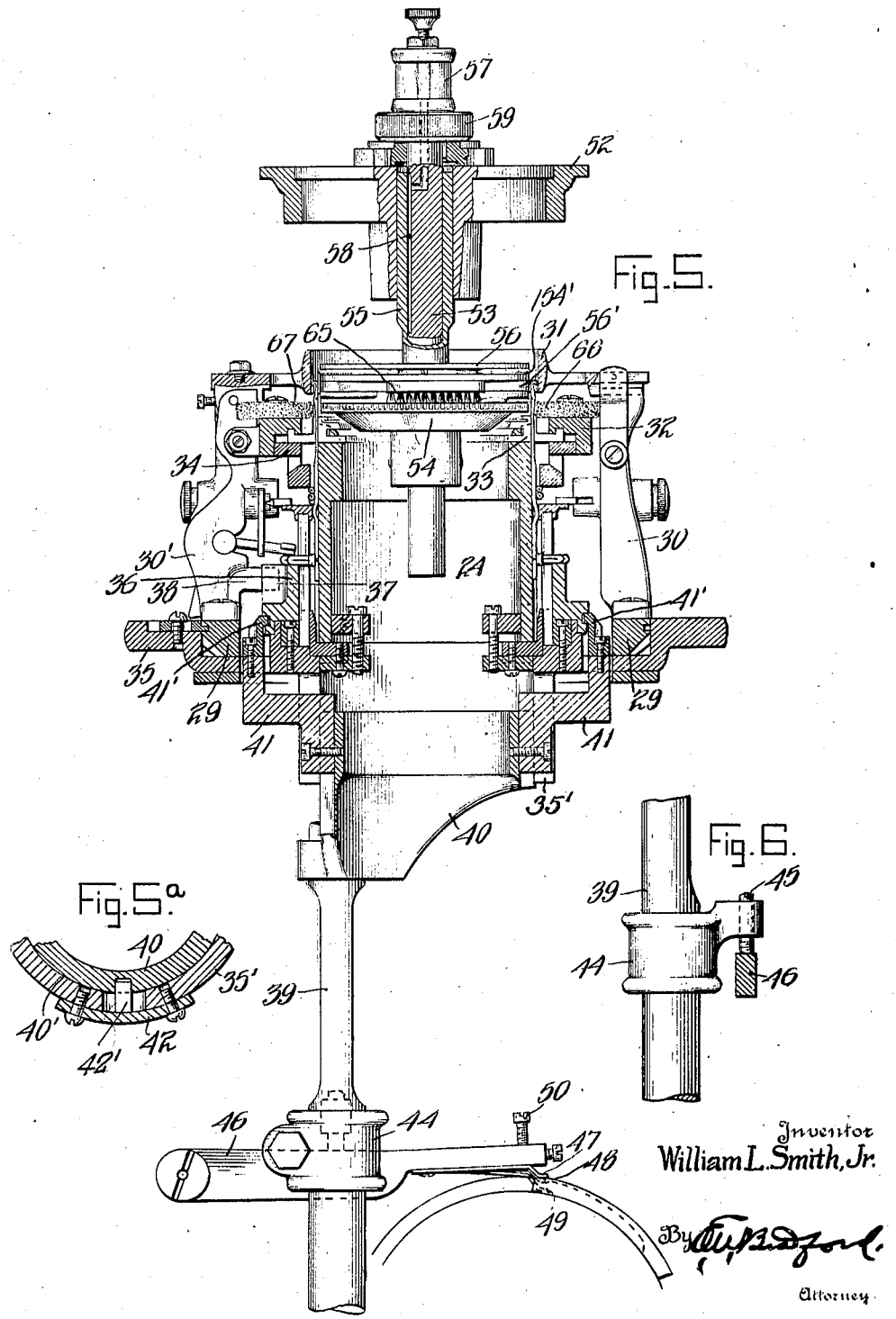
Inventor
William L. Smith, Jr.
Attorney April 12, 1932. W. L. SMITH, JR 1,853,783
KNITTING MACHINE
Filed April 28, 1925 13 Sheets-Sheet 5
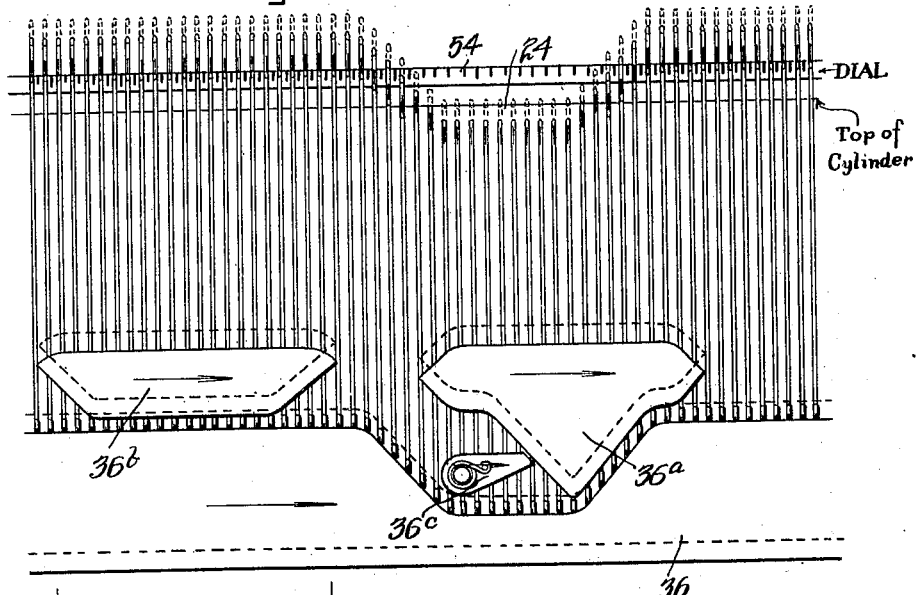
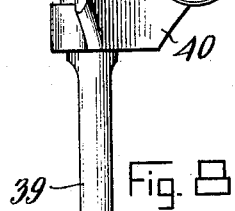
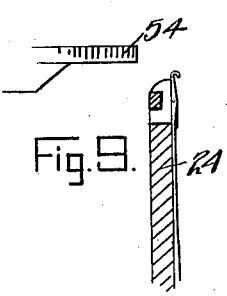
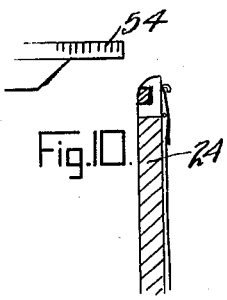
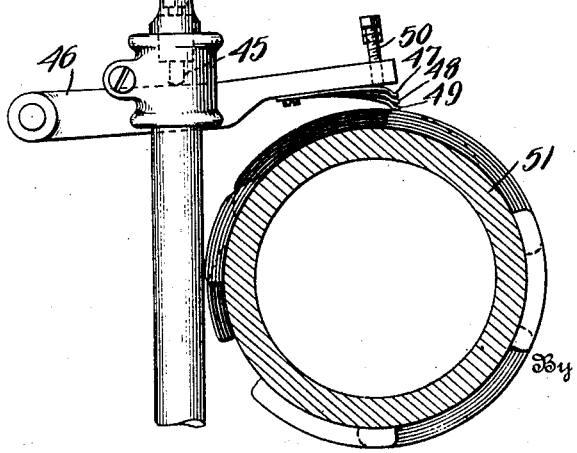
Inventor
William L. Smith, Jr.
Attorney

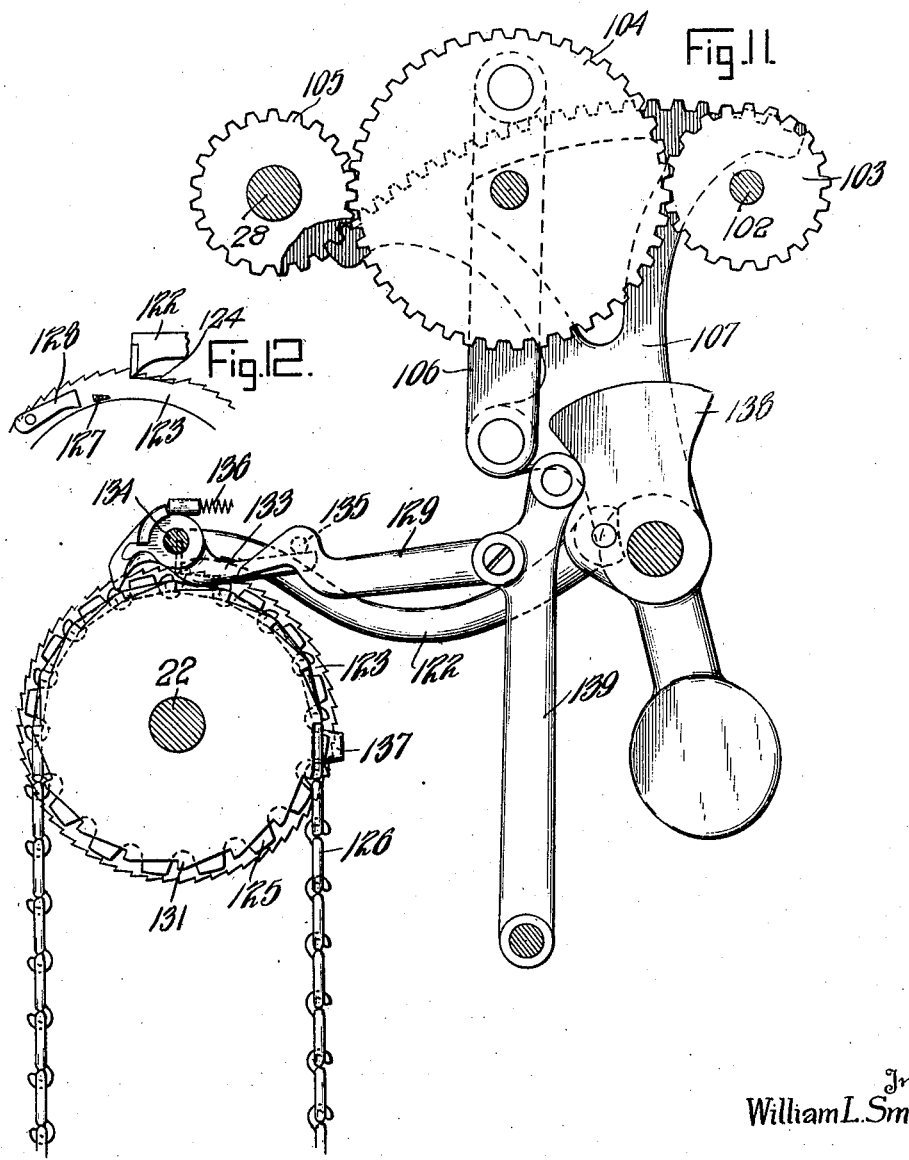

April 12, 1932.  W. L. SMITH, JR  1,853,783
KNITTING MACHINE
Filed April 28, 1925  13 Sheets-Sheet 7
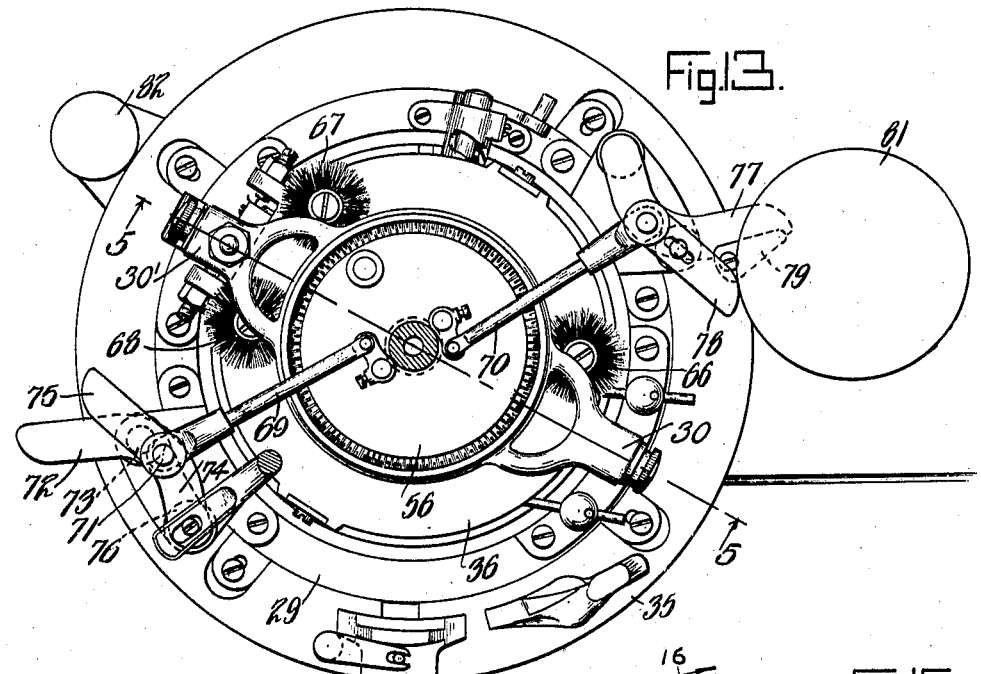
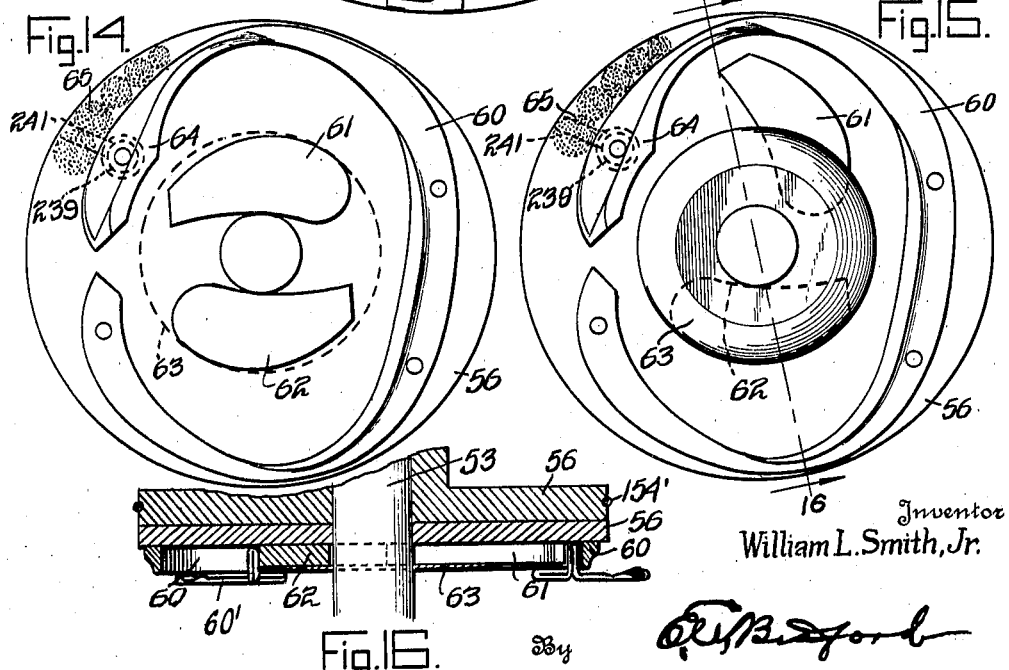
Inventor
William L. Smith, Jr.

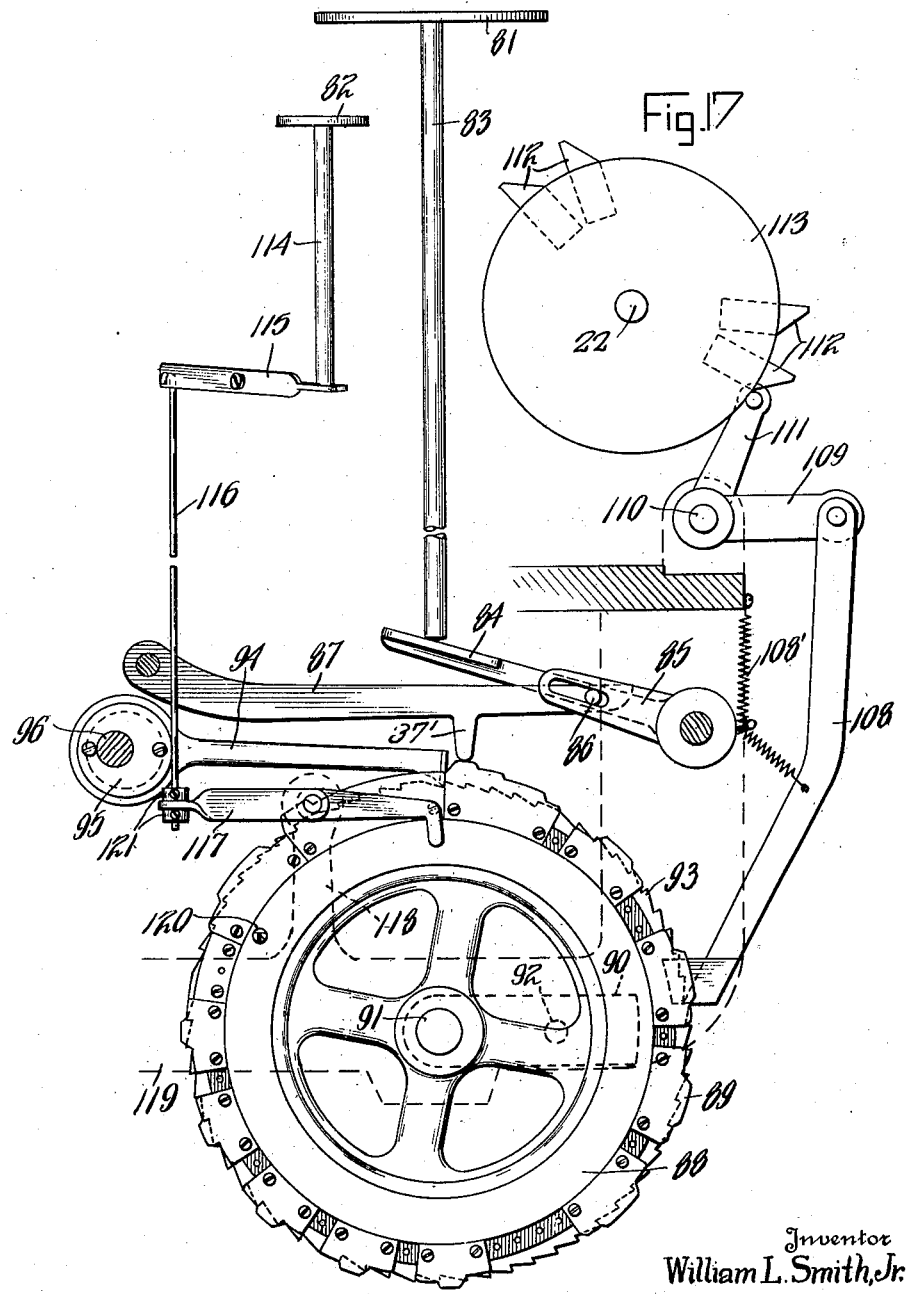

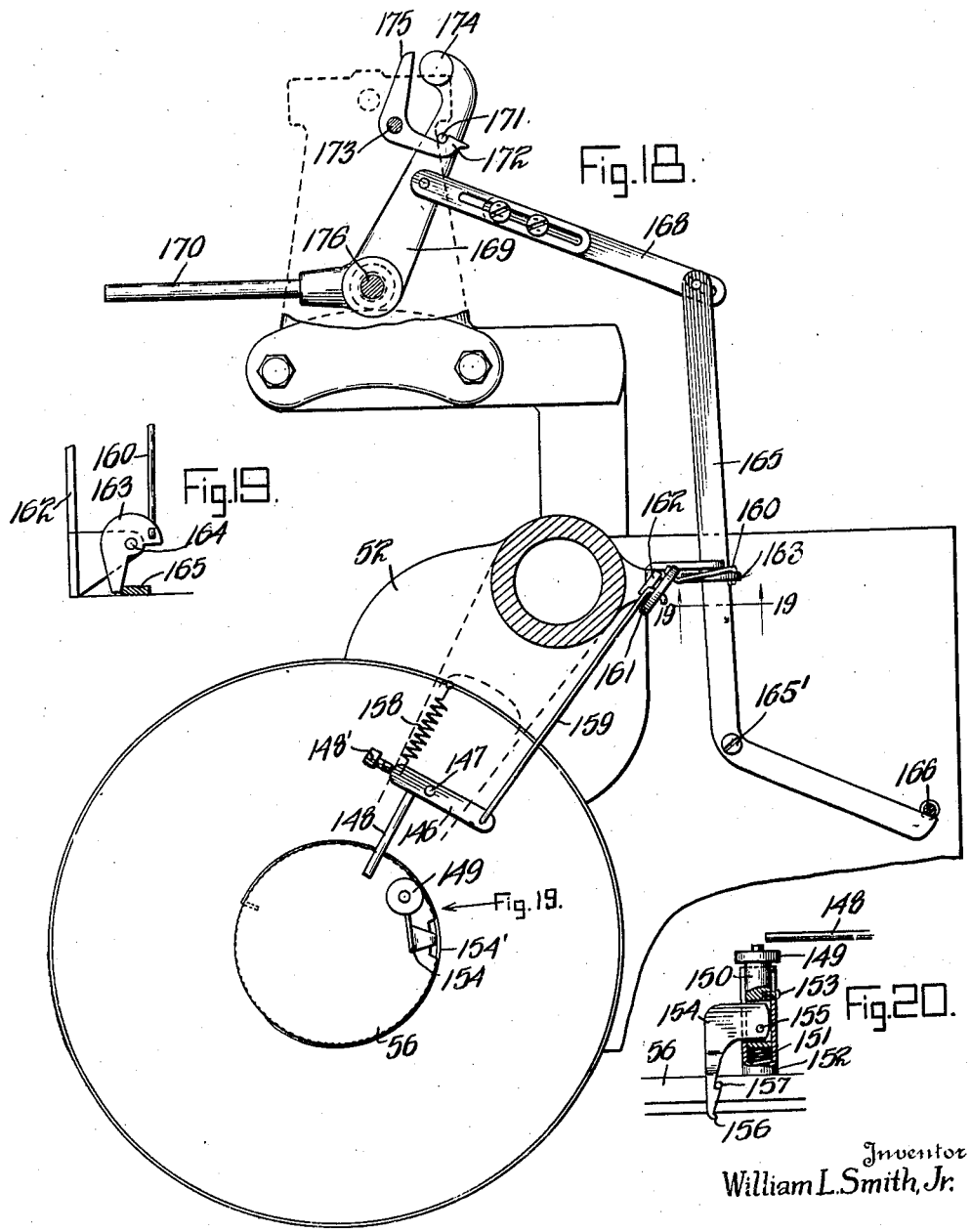

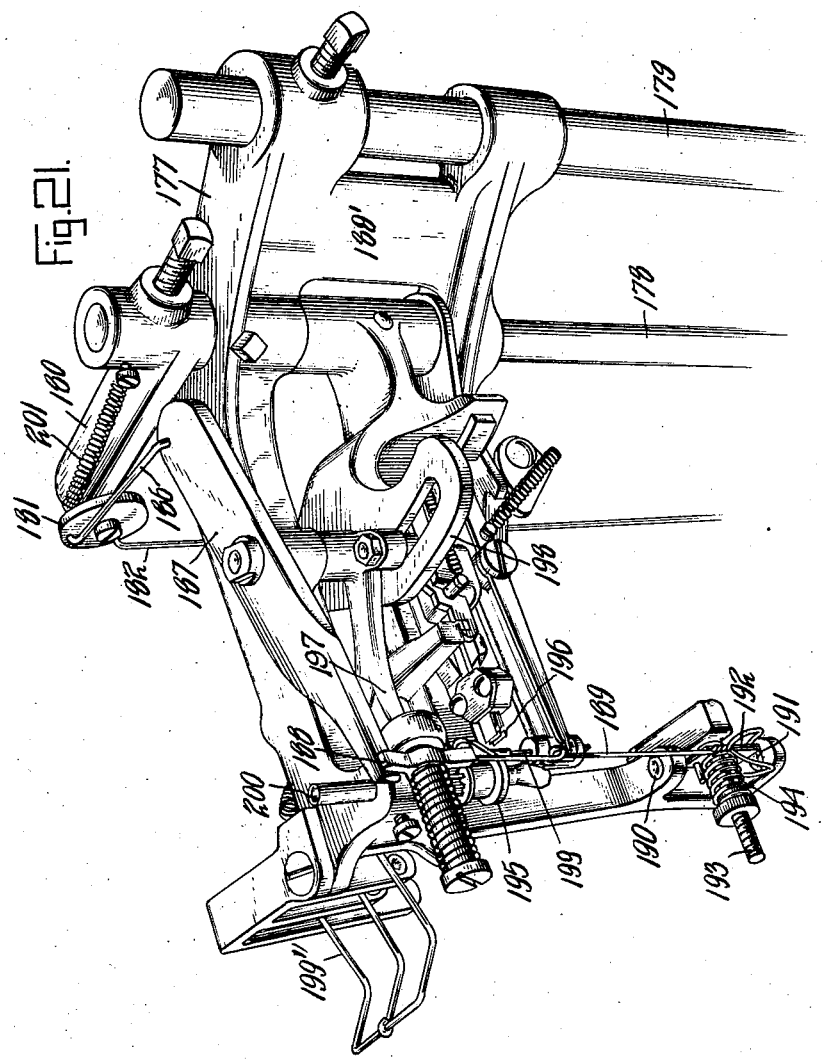

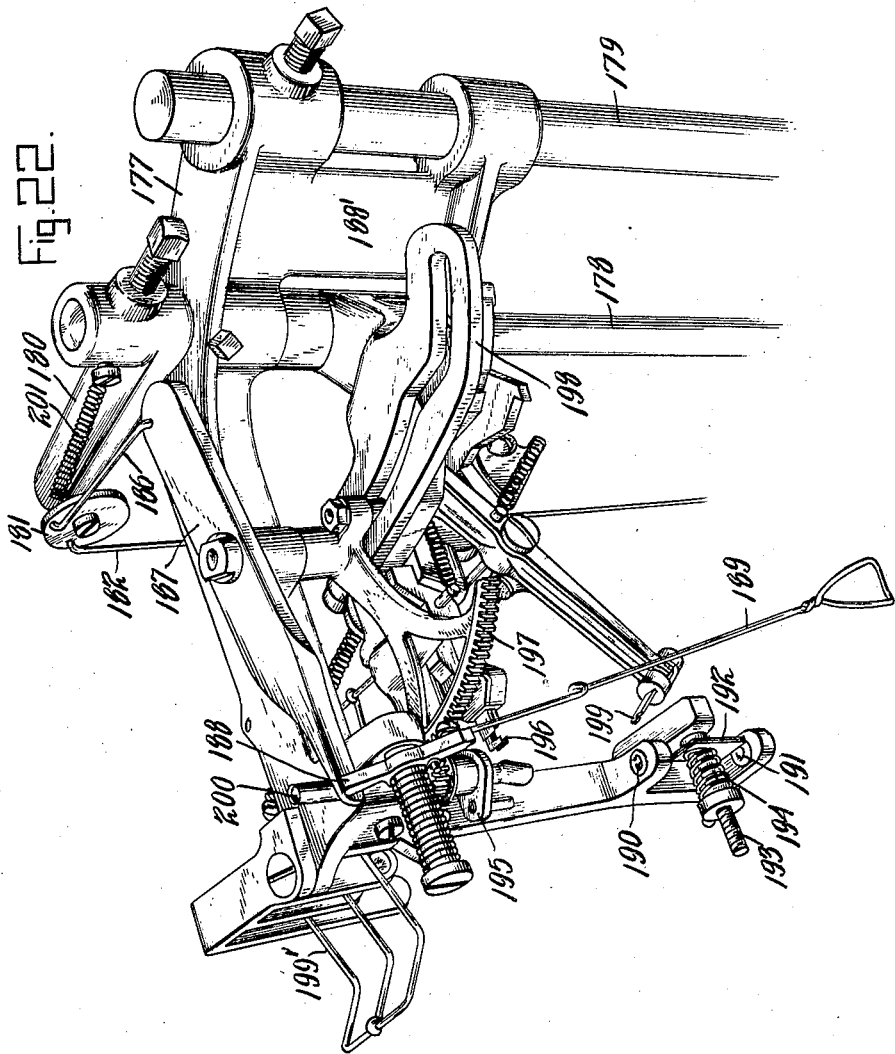

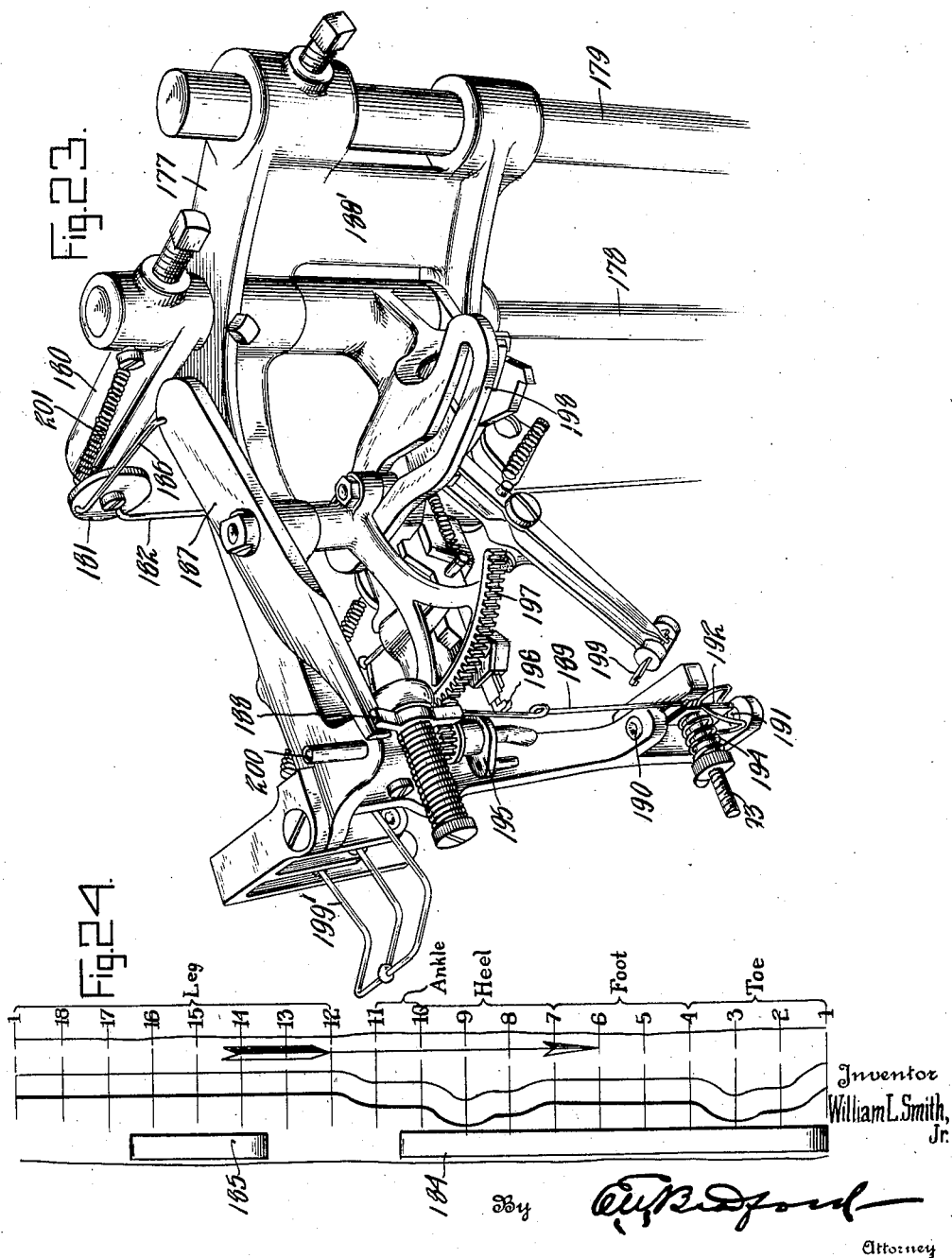

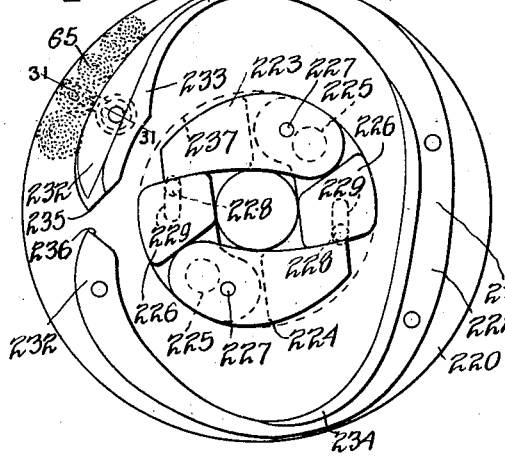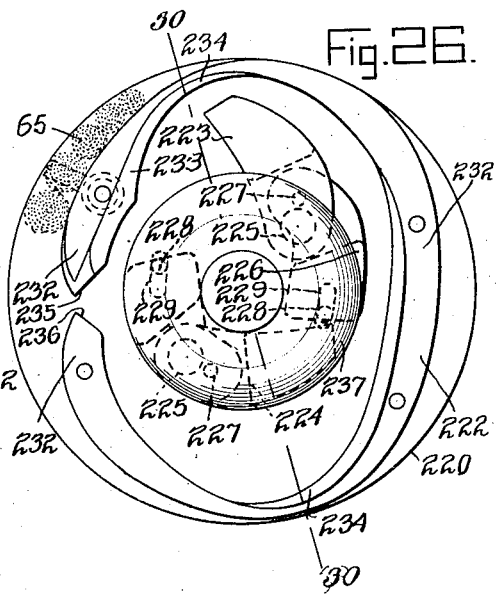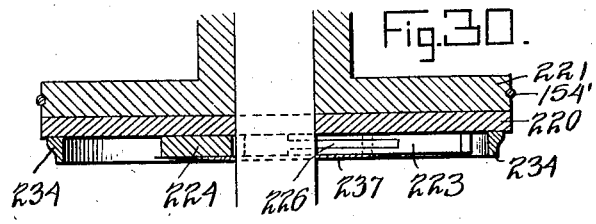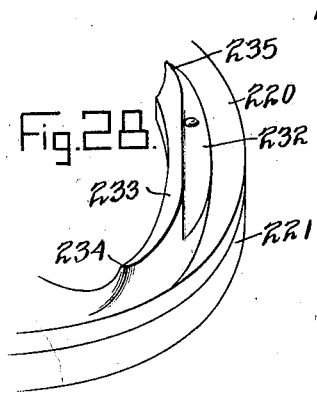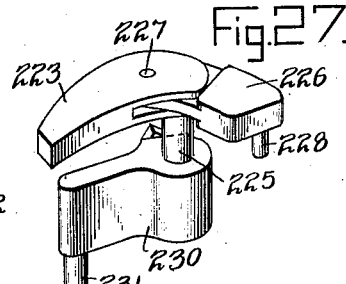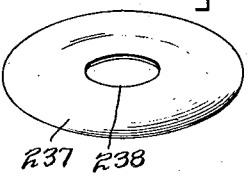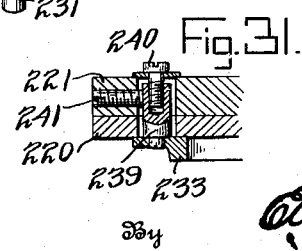

Patented Apr. 12, 1932

1,853,783

UNITED STATES PATENT OFFICE

WILLIAM LEE SMITH, JR., OF NASHVILLE, TENNESSEE, ASSIGNOR TO MAY HOSIERY MILLS, OF NASHVILLE, TENNESSEE, A CORPORATION OF TENNESSEE

KNITTING MACHINE

Application filed April 28, 1925. Serial No. 26,453.

My said invention relates to knitting machines and it is an object of the same to provide simplified and improved mechanism for knitting in one continuous operation a stocking having a ribbed leg and a plain foot, the direction of knitting being from toe to top.

Another object of the invention is to provide improved means for opening the latches of the needles and insuring that they remain fully opened.

Another object of the invention is to provide for free movement of the dial needles for which purpose means are provided to remove lint from the dial and also means to lubricate the dial slots and the needles therein.

Another object is to provide improved means for varying the length of the stitches in different parts of the stocking.

Various minor improvements will appear in the subjoined specification, all of which tend to simplicity and continuity of operation in machines of the character described.

Figure 1:
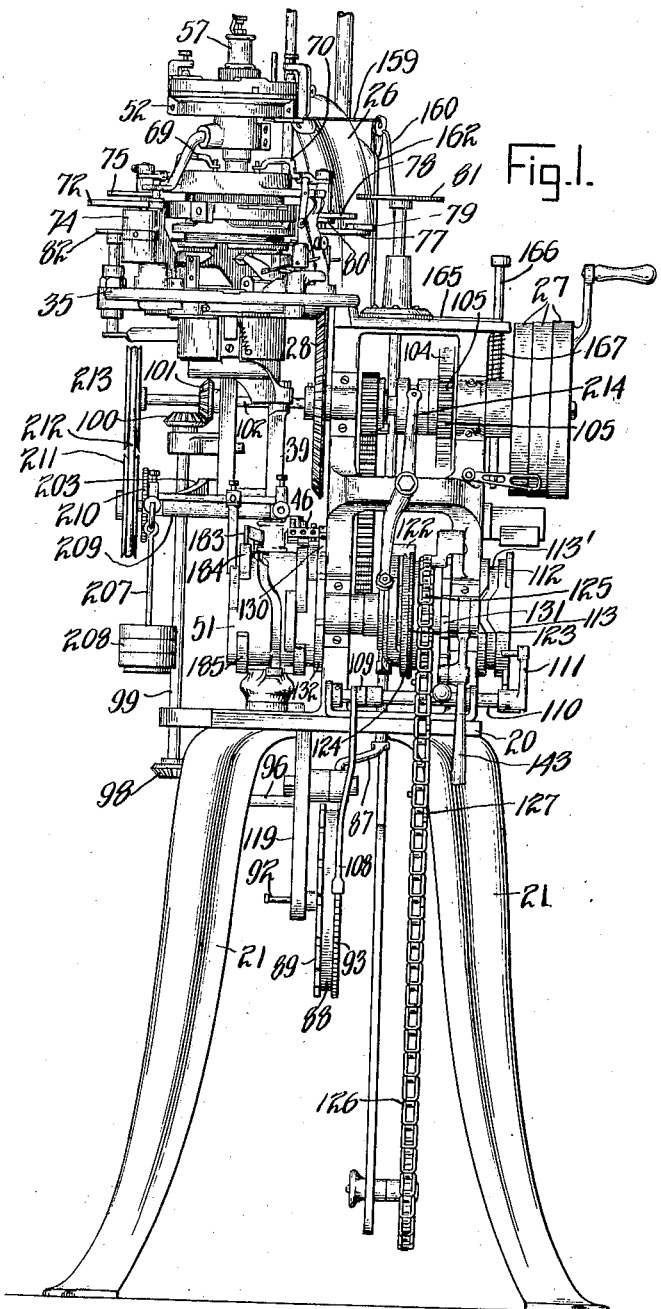

Referring to the accompanying drawings which are made a part hereof and on which similar reference characters indicate similar parts, Figure 1 is a front elevation of the machine embodying my invention, Figure 2, an elevation taken from the left side of the machine, Figure 3, an elevation taken from the right of the machine.

Figure 4:
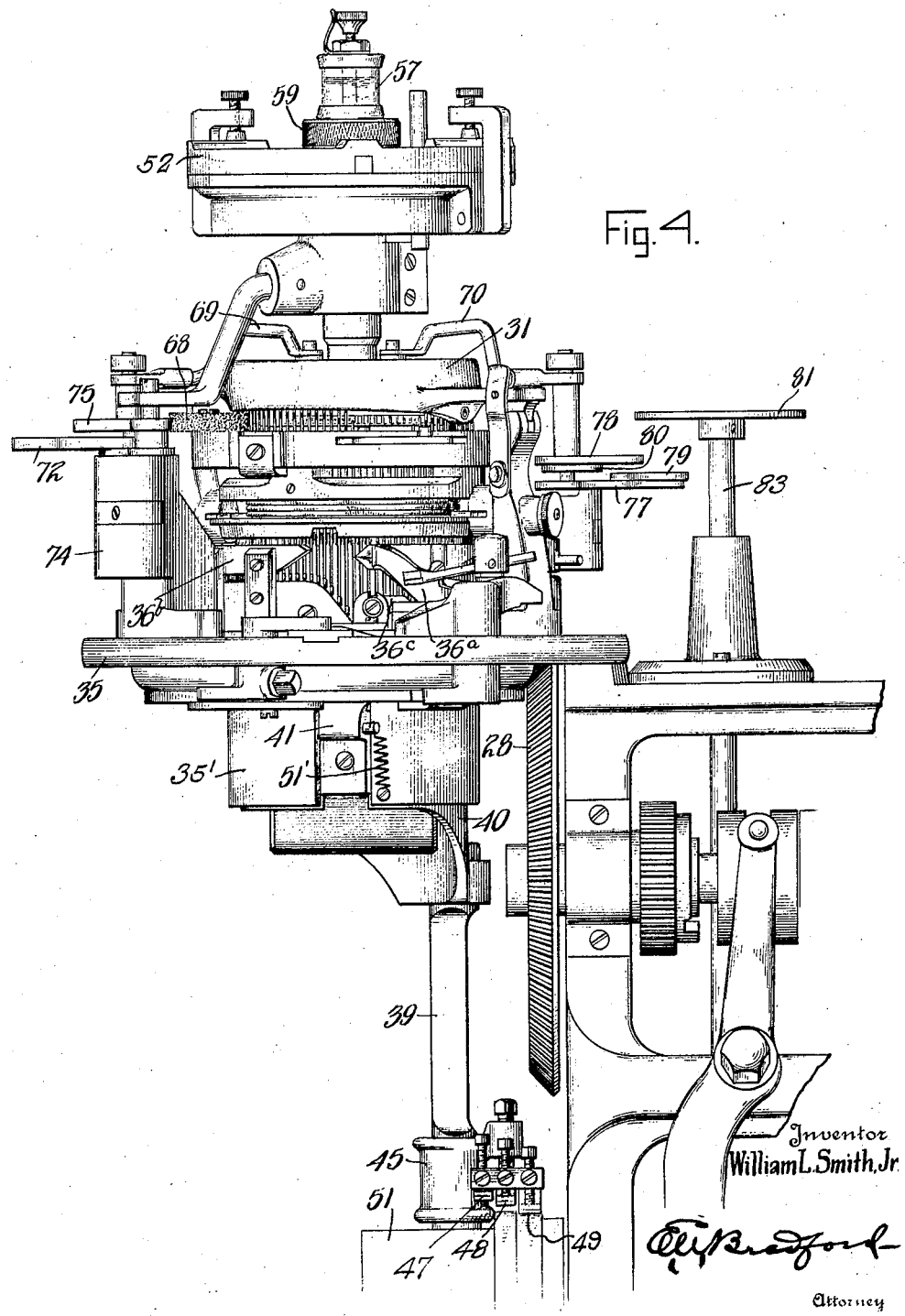

Figure 4, a view similar to Figure 1 but on a larger scale,

Figure 5, a vertical section taken centrally of the needle cylinder, said section being taken on line 5—5 of Fig. 13, Figure 5a, a detail of parts in Figures 2 and 5, Figure 6, a detail on an enlarged scale of parts shown in Fig. 5, Figure 7, a development of the needle cylinder, Figure 8, an enlarged detail including parts shown in Fig. 5, Figures 9 and 10, sections illustrating the knocking-over position of the cylinder needles for different vertical adjustments of the cam oring, Figure 11, a side elevation of pattern operating mechanism, Figure 12, a detail of parts shown in Fig. 11, Figure 13, a plan of the machine with parts omitted, Figure 14, a full-sized plan of the dial cam cap viewed from below, Figure 15, a similar view with the needle-projecting cams differently positioned, Figure 16, a vertical section of the cam cap on line 16—16 of Fig. 15, Figure 17, a composite elevation of pattern mechanism viewed from the left side of the machine, Figure 18, a horizontal section showing the elements of the stop motion in plan, Figure 19, a detail of a part of the stop motion on line 19 of Figure 18, Figure 20, an elevation of parts shown in Figure 18, this view being taken along the line of the arrow in Fig. 18, Figure 21, an elevation of yarn controlling mechanism in one position, Figure 22, a similar view with some of the parts in a different position, Figure 23, a similar view with some of the parts in still another position, Figure 24, a development of yarn change controlling features of the pattern drum, Figure 25, a bottom plan of a modified dial cam plate with the cams in withdrawn position, Figure 26, a similar view with one cam projected, Figure 27, a perspective of a needle projecting cam and actuating means for positioning it variously with respect to the dial cam plate, Figure 28, a perspective of a fragment of the dial cam plate, Figure 29, a perspective of a dial plate positioned as indicated in dotted lines in Figures 25 and 26, Figure 30, a vertical section on line 30—30 of Figure 26, and Figure 31, a section on line 31—31 of Figure 25, the brush being omitted for clearness.

The general features of construction of the machine may be similar to those in the patent to Mayo No. 726,178, April 21, 1903, with such additions and variations as adapt it to knit hosiery such as above referred to, but these general features may be varied in many ways obvious to those skilled in the art of knitting.

In the drawings the base 20 is supported on legs 21 in ordinary manner. A framework rising from the base supports a pattern drum shaft 22 (Figs. 2 and 3), a main drive shaft 23, a needle cylinder 24 (Fig. 5) a dial bracket indicated generally at 26, and various minor or accessory parts. The main drive shaft carries fast and loose pulleys indicated at 27, a gear 28 for driving the rotatable knitting cams and any desirable or conventional gearing for driving the knitting cams reciprocatingly, the direction of movement being controlled by a part of the pattern drum in old and well-known manner. The gear 28 has beveled teeth engaging similar teeth on a ring gear 29 mounted in a bed-plate for driving the rotatable knitting cams, said ring-gear also supporting the latch-ring posts 30 and 30′ and the dial posts hereinafter described. A latch ring 31 is supported on said latch-ring posts. A webholder cam ring 32 is provided for actuating webholders 33 in a bed 34 mounted on the needle cylinder 24.

The ring-gear 29 is rotatably supported on a bed-plate 35 forming part of the fixed framework of the machine, said bed-plate having a depending sleeve 35′ (Fig. 5a). A cam ring 36 is supported for rotation with the ring-gear, said cam ring having two lugs 37 receiving between them two lugs 38 on the post 30′. These interengaging lugs form means for driving the cam ring from the ring gear 29.

The cam ring carries a stitch-cam 36a, guard-cam 36b, and an auxiliary pivoted stitch-cam 36c as shown in Fig. 7, this cam being adjustable up and down and being held by a spring in the position illustrated, so as to permit the needles to pass freely when knitting reciprocating work. The purpose of the auxiliary stitch-cam is to hold the cylinder needles down against the pull of the dial needles as they are being retracted to knock over the loops on said needles. If this cam is omitted the stitches on the cylinder needles (and of course the cylinder needle wales) are knitted very unevenly as some cylinder needles are tight in their slots while others are loose and so are easily lifted by the pull of the dial needles transmitted through the fabric. The cam is triangular so as to pull only one or two cylinder needles at a time down against the tension of the dial needles. A wider cam is found to be liable to cause the yarn to be cut by the needles.

For varying the length of stitches on the cylinder needles I have provided means for moving the cam ring up and down relatively to the needle cylinder and thus varying the extreme lower position of the cylinder needles. This changes the distance the needles travel before knocking over and thus changes the length of the loops drawn by them. Such means includes a post 39 connected to a sleeve 40 cylindrical at its upper end and fitting in a cylindrical downward projection of the bed-plate 35. The sleeve has oppositely located upwardly projecting arms 41 having cam ring clamps 41′ mounted thereon at their upper ends to engage a circumferential notch in the thickened lower portion of the cam ring. The arms 41 fit loosely in vertical slots in the depending sleeve of the bed-plate. These arms, as will be understood, extend up through slots in the bed-plate 35 and preferably the thin upper cam ring clamps 41′ on the arms are of greater width than the lower portions so that the slots are T-shaped with the narrow portion extending radially from the axis of the cylinder and the wider portion extending circumferentially thereof. A device is shown at 42 for holding the sleeve 35′ against rotation in sleeve 40 while guiding sleeve 35′ in its up and down movement, this device including a pin 42′ (Fig. 5a) projecting into a slot 43 (Fig. 3) the pin being fixed to a strap 42 or held in place thereby in any convenient manner.

A collar 44 is clamped on the post 39 and has a lateral arm and an adjustable screw 45 bearing at its lower end on a lever 46. At its free end the lever has a series of leaf springs 47, 48 and 49 adjustable by means of set screws 50. These springs have bent free ends resting on cams on a drum section 51 on the drum shaft 22. These cams are arranged in three series corresponding to the three springs 47, 48 and 49 and are of varying heights. As the drum shaft rotates the cams act on the respective springs to lift the lever and the post 39 and therefore the arms 41 and the cam ring to different heights thereby varying the length of stitches on the cylinder needles. All upward movement of the post 39 and connected parts is resisted by a spring 51′ (Fig. 4) on the downward extension of the bed-plate which spring tends to restore the cam ring and connected parts to their lowermost position. The positions of the needles in different positions of adjustment of the cam ring are illustrated in Figure 7. Necessarily the lower limit of movement varies in the same manner and the difference of position between the knocking-over level of the cylinder verge and the extreme lower position of the needles represents the difference in stitch length for different positions of the cam ring. The length of stitch in a ribber may be said to be determined by the distance between the level of the dial needles and the lowest position of the cylinder needles when drawn down by their stitch cams. As a convenient means of illustration Figures 9 and 10 indicate the position of the dial 54 and the cylinder 24, Figure 9 showing the downward stroke of the needles as ceasing before the hook has passed below the cylinder verge while Figure 10 shows the stroke of the needle as terminating with the hook considerably below the cylinder verge.

The dial bracket 26 has a horizontal part 52 including a dogless attachment of any desirable or conventional character and this part supports a dial post 53 to which the dial 54 is fixed. A dial cam cap 56 with a dial cam plate of hardened steel fixed thereto and a sleeve portion 55 is journaled on the dial post (Figs. 4 and 5). An oil cup 57 is mounted on the upper end of the dial post and an oil passage extends down through the dial post to a groove in one side of the same at 58 by means of which the contacting surfaces of the dial post and the sleeve 55 are lubricated. This also provides means for supplying a limited quantity of oil to the needles and the needle grooves in the dial, such oil seeping down between the dial post and the sleeve to the needle grooves. A nut 59 has threaded engagement with the dial post below the oil cup and said nut is supported against downward movement by the dial bracket 26 connected to the part 52. Said nut provides means for adjusting the dial post and the dial vertically.

I have shown the one side of the dial cap 56 as provided with an outer cam or series of cams 60 which may be formed in one continuous piece having different elevations for performing different functions. The needle-projecting cams comprise a pair of cams 61 and 62 pivoted at opposite sides of the axis. A thin flat disk 63 preferably formed of sheet steel rests underneath the projecting cam and limits the inward movement of the needle butts.

A the outer margin of the dial cam cap beyond the needle-retracting cam 64 I provide a brush or series of brushes 65 which serve to close the latches of the dial needles 60' (Fig. 16) and to remove lint from the dial as well as to prevent lint being drawn in by the dial needles as they are being retracted.

I have shown in Figures 5 and 13, a plurality of rotatable brushes 66, 67 and 68, the brush 66 being mounted in advance of the latch-ring post 30 and the brushes 67 and 68 being located at opposite sides of the latch-ring post 30'. When cast-off cam 62 projects the needles all the way out they pass through latch-opening brushes 67 and 68. The needles travel through said brushes for several revolutions to insure that all the latches are opened. As the cams and latch openers rotate the dial needles are moved out in a wave, the brush 68 initiating the opening operation which is supplemented by brush 67, the latter brush being intended to lay latches fully open which have been only partly opened by brush 68. Brushes 67 and 68 are fixed in place, while brush 66 is free to rotate. The latter brush supplements the action of the first two in that it opens any latches which may have passed brushes 68 and 67 without being opened.

The needle projecting cam 61 is the one used in knitting while the cam 62 is a clearing or cast-off cam for projecting the needles to clear their latches preparatory to casting the work from the dial needles. In the operation of knitting the cam 61 has three positions, viz, the position indicated in Figure 14 which is an idle position in which the needles do not act on the yarn, an extreme outward position (Fig. 15) which is the knitting position where the needles take yarn and knit off the old loops, and an intermediate or tuck position in which the dial needles take yarn but do not knit off the old loops. The cam 62 has only two positions, viz., the idle position indicated in Figure 14 and an extreme outer position for clearing the latches preparatory to casting off the loops of the work.

For controlling the positions of the needle projecting cams as above indicated I have provided pattern controlling means including links 69 and 70 connected respectively to the cast-off and the knitting cams. The link 69 of the cast-off cam at its opposite end is connected to a post 71 rising from one end of a lever 72 pivoted at 73 on dial-cam post 74 (Fig. 2) mounted on the ring gear 29. A lever 75 is pivoted at 76 on said dial cam post and has an opening approximately midway of its length through which the post 71 extends. It will be understood that the free outer end of the lever 72 may be moved inward toward the axis of the machine whereupon the inner end will act on the cast-off cam to move it outward, while when the free outer end of the lever 75 is forced inward it will act through the link to force the cast-off cam inward.

The link 70 of the knitting cam 61 is similarly controlled by means of levers 77 and 78, the second set of levers being positioned at a lower level and differing from the first in that lever 77 has an upwardly extending lug 79 and lever 78 has a depending lug 80 (Figs. 1, 4 and 13). Preferably these lugs are separate pieces secured to the levers and adapted for pivotal adjustment with respect thereto to compensate for wear and to vary slightly the time of operation.

The above described parts rotate with the rotary cams of the knitting machine. For actuating the levers 72, 75, 77 and 78 I provide a pair of disks 81 and 82 (Figs. 1 and 13) with pattern mechanism for raising and lowering them to place them in the paths of the respective levers, the disk 81 being adapted to operate on any one of the levers of either set while the disk 82 operates only on the levers of the lower set, i. e. levers 77 and 72, to control the operation of the needle projecting cam 61 hereinafter referred to as the knitting cam for convenience, it being the needle projecting cam of the group of cams actuating the dial needles in the knitting operation proper.

For controlling the action of the disks or bob-cams 81 and 82 (Fig. 13) I have provided pattern mechanism, said pattern mechanism including a rod 83 to which the disk 81 is fixed, this rod resting on a rockarm 84 rigidly secured to a rockshaft bearing a rockarm 85. The rockarm 85 is slotted to receive a pin 86 on a lever 87 (Fig. 17) which has a lug 87' bearing on the periphery of a pattern form, here shown as a wheel 88. At one side the pattern form, here shown as a wheel 88 has a plurality of interchangeable blocks 89 with radial cams for raising the lever 87 and therefore the disk 81 to different heights.

A brake 90 in the form of a leaf spring bears against the side of the wheel 88 to prevent overrunning, said leaf spring being mounted on the stud-shaft and clamped between a shoulder on the stud-shaft and a support shown in dotted lines at 119 (Fig. 17). See also Fig. 1. The tension of the brake is regulated by a set screw 92 (Figs. 1 and 17). At the other side of the wheel 88 from the cams 89 is a series of ratchet teeth 93 (Figs. 1, 3 and 17). A pawl 94 engages the ratchet teeth for ordinary operation, this pawl being driven by an eccentric 95 on a shaft 96 (Figs. 1, 2 and 17).

The shaft 96 is driven by a train of gearing comprising bevel gears 97 and 98, a vertical shaft 99, bevel gears 100 and 101 (Fig. 1), a horizontal shaft 102, and a pinion 103 (Figs. 3 and 11) meshing with the gear 104 (Figs. 1, 3 and 11) driven by the pinion 105 on the main shaft, said gear 104 being connected by a link 106 to the oscillating segment rack 107 of the conventional gearing for changing from rotary to reciprocating movement of the head and vice versa.

The circle of ratchet teeth 93 on the pattern wheel 88 is not continuous but has blanks at intervals and when these are under the pawl the pattern wheel stands still. For causing the pattern wheel to resume operation I have provided an auxiliary pawl 108 engaging the ratchet at its lower end and pivoted at its upper end to a rockarm 109 fixed on a rockshaft 110. At a distance from the rockarm 109 another rockarm 111 is fixed to the rockshaft 110 said arm having a pin extending into the path of lugs 112 on a pattern drum section 113 carried by the main drum shaft which drum section also controls the position of the driving belt on the pulleys by means of a cam groove 113' engaging a roller on the belt shifter lever (Fig. 3). A spring 108' serves to hold the pawl 108 in engagement with its ratchet.

The pattern wheel 88 also operates the bob-cam 82 through a rod 114 on which the disk is fixed said rod resting at its lower end on a lever 115 connected by a link 116 to a lever 117 pivotally supported on an arm 118 extending upward from the bracket 119 on which the pattern wheel is mounted. The lever has a bent end for engagement with an abutment 120 here shown in the form of a pin extending laterally from the pattern wheel or form. Adjusting means for the connections from the pattern form to the bob-cam 82 includes a pair of collars 121 secured to the link 116 by set screws.

The machine also includes pattern mechanism for controlling the operation of the main drum shaft and connected parts, such pattern mechanism being substantially as in Mayo Patent No. 726,178. Such pattern mechanism comprises a driving pawl 122 (Fig. 11) connected to the oscillating segment 107 and at its forward end adapted to engage either with the ratchet teeth on a pattern form shown as a multiplier wheel 123 (Figs. 1 and 12) or else with the ratchet teeth 124 on a ratchet fast to the sprocket 125 over which the chain 126 runs. The multiplier wheel 123 runs freely on a bearing on the sprocket, the sprocket and the chain standing still during movement of the ratchet 123. The ratchet 123 has a blank space (Fig. 12) and when the tooth of the pawl 122 is in the blank space the teeth 124 are engaged and the sprocket is driven one tooth for four rotations of the needle cylinder. This continues until a spur 127 (Figs. 1 and 12) of which there are several on the chain 126 engages a lug 128 fastened to the adjacent side of the multiplier wheel 123. This moves the multiplier wheel until the blank space passes the tooth of the pawl 122, bringing it into engagement with the next tooth on the wheel 123. The teeth of the wheel 123 are higher than those on the sprocket wheel and therefore the multiplier wheel is now driven while the sprocket and the chain stand still.

The sprocket 125 is loosely mounted on the main drum-shaft 22, this shaft being driven by a pair of pawls 129 (Figs. 3 and 11) and 130 (Fig. 1), the pawl 129 engaging ratchet teeth 131 on a ratchet fixed to the drum-shaft, and the pawl 130 engaging teeth of a ratchet 132 also fixed to the camshaft, the teeth of the second ratchet being relatively widely spaced and this ratchet serving to start the camshaft at certain times when the pawl 129 is out of action. The pawl 129 is normally held out of action by a lever 133 pivoted at 134 engaging at one end under a pin 135 on lever 129 and held in the position shown in Figure 11 by a spring 136. The chain 126 has lugs 137 adapted to engage under the front end of the lever 133 to move the same against the tension of the spring 136 and lower the pawl 129 into engagement with its ratchet. The pawl 129 is operated by a cam 138 fixed to the segment 107 which cam acts on a lever 139 on which the pawl 129 is pivoted, a spring 140 (Fig. 2) serving to retract the lever. The pawl 130 is similarly operated by a lever 141 (Figs. 2 and 3) on which it is pivotally mounted, this lever being actuated by a lug (not shown) on the segment 107 and being retracted by a spring 142. The drum-shaft may be operated manually by a pivoted pawl having a handle 143 (Fig. 1).

In Figures 18, 19 and 20 I have shown a stop motion for arresting the operation of the machine in case a needle is broken or injured as by breaking off the butt or the hook of the needle or breaking or bending the latch, etc. This device will also stop the machine in case of damage to a web-holder, as by breaking off the butt of the web-holder.

On the underside of the horizontal portion 52 of the dial bracket I have mounted a lever 146 held in place by a screw 147 engaging a threaded opening in said portion 52. The lever has an arm 148 extending approximately radially of the machine into the path of a roller 149 (Figs. 2, 18 and 20) on a plunger 150 forced upward by a spring 151 in a casing 152 mounted on the dial cam cap 56. A set-screw 148' holds the finger in adjusted position on the lever. The plunger is guided for up and down movement in said casing by means of a screw 153 passing through a slot in the casing at one side and at the other side by means of a trip finger in the form of a bent lever 154 pivoted at 155 on the plunger and having at the other end a forwardly extending point 156 which may be made adjustable if desired. A wire 154' surrounds the dial cam cap, said wire lying in a circumferential notch on the cap and serving to separate the lever from the cylinder needles. A notch intermediate the ends provides a hook for engagement with a pin 157 on the dial cam cap by means of which the plunger is normally held in the position shown in Fig. 19.

The lever 146 is normally held in the position shown in the drawings by means of a spring 158 attached to one end thereof. A link 159 (Figs. 1, 3 and 18) is attached to the other end of the lever. The other end of the link 159 is connected to a link 160 by means of a disk 161 pivoted on a post 162 adjacent the dial bracket. A lever 163 is pivoted at 164 on an arm extending from the post 162. The link 160 is attached at one end to said lever which at the other end has a face contacting with one arm of a lever 165 (Figs. 18 and 19) pivoted at 165'. The other arm of said lever is formed to engage a notch in a plunger 166 and said plunger is pressed by spring 167 (Fig. 1) in a direction to operate the belt shifter or other power controlling element for stopping the machine.

The lever 165 at its other end has pin engaging a slot in a link 168 thus providing a lost motion connection. Link 168 is formed of two relatively adjustable parts, one of which is pivotally connected to a lever 169 having an arm 170 for manual engagement by the operator for setting the stop motions in connection with the starting of the machine and another arm carrying a pin 171 for engagement with a hook 172. The hook 172 is on one of two arms of a lever fixed to an upright shaft 173 of a well known form of yarn stop motion which is set in working position by the engagement of the upturned end 174 of lever 169 pivoted at 176 with arm 175 which operation also brings the hook 172 into position to arrest the lever 169 when it moves in a clockwise direction after setting the upper stop motion, under the impulse of a spring (not shown). The setting of the yarn stop motion also returns the lever 165 into engagement with the notch in the plunger 166.

It will be seen from the foregoing that should a web-holder or a cylinder needle break or a needle lose its butt or for any other cause the cloth should pile up at the edge of the forming fabric the bunch will be engaged by the hook 156 which will thereupon be disengaged from the pin 157. The plunger 150 will now rise bringing the roller 149 into the path of the arm 148 which will be swung in a clockwise direction to pull on the lever 163 and swing the lever 165 to release the plunger 166. It will be evident that when the plunger 150 rises the arm 154 must also rise carrying the point 156 safely out of the way of the dial and cylinder needles by engagement with the trip finger as has been a frequent occurrence with stop motions heretofore in use. When the machine is on reciprocating work, the plunger 150 will rise when released, but if the cams are turning clockwise the machine will not knock off, as the lever 163 will merely be drawn back from lever 165. On the return movement, however, the roller will strike arm 148 and stop the machine.

Figs. 21, 22 and 23 represent an improved device generally similar to that in U. S. patent of Mayo No. 726,229, April 21, 1903, and similarly located on the machine for controlling the introduction and withdrawal of splicing yarn for the fabric, this device being located at the top of the machine and comprising a bracket 177 supported in any conventional or desirable manner as on a pair of posts 178 and 179. An arm 180 is fixed to one of said posts and said arm supports a rocking disk 181 having connected thereto at one point a link 182 (Figs. 2 and 21) which link is attached at its lower end to a lever 183 having its forward extremity bent downward and coacting with two cams 184 and 185 (Fig. 1) on the pattern drum to control the tensioning devices. Another link 186 is attached at one end to said disk and at the other to a lever 187 engaging at its forward extremity an arm 188 swingably supported on a pivot forming part of a bracket 188'. A downward extension of the arm 188 carries a slack take-up arm 189 for engagement with yarns passing through guides 190 and 191. Between the guides a pair of tension plates 192 are located on a screw 193 on which is also a spring 194 for drawing the tension plates together, this arrangement being old and well-known in the art. A knotter for tying the splicing yarn about the main yarn is also shown, this knotter comprising a twisting device 195, a tying device 196, a rack segment 197 for coacting with a pinion for rotating the twisting device, a cam plate 198, a hook 199 and other parts well-known to those skilled in the art. (See Mayo No. 726,229.) The operation of these knotting devices is controlled from the pattern drum by oscillation of the upright rod 178 which ends just above bracket 188' by means such as in the last mentioned patent.

The position shown in Figure 21 is that assumed when the non-spliced parts of the fabric are being formed. In knitting the leg, e. g. the main yarn passes down through a guide indicated at 200 and then through the guides 190, 191 to the customary guiding means adjacent the knitting point, the bent extremity of lever 183 resting on the cam 184. When the leg of the stocking is finished and just after starting the next stocking at the point where rotary motion of the machine changes to reciprocating movement for making the toe it is desirable to add a splicing yarn for reenforcing the toe. This splicing yarn passes through the guiding and tensioning devices 199' and is held by the twisting device 195 in position to be tied to the main yarn. The bent extremity of the lever 183 now rides off the cam 184 permitting the spring 201 to pull up the link 182 and throw the lever 187 away from the lever 188 thus permitting the slack take-up arm to swing out into the position illustrated in Fig. 22. At the same time the pattern control causes the parts 195, 196, 199, etc. to tie the splicing to the main yarn. The movement controlling pattern devices have now caused the movement of the machine to change from rotary to reciprocating and the slack of the main yarn is taken up by the arm 189 which swings from the position of Figure 21 to that of Figure 22 on each reversal of movement of the cam ring 36 and connected parts, the yarn now being drawn by the arm 189 at its lowest position between the plates 192 which clamp the yarn to prevent its being drawn ahead faster than the needles can take care of it.

At the completion of the knitting of the toe the machine again goes on rotary motion whereupon the pattern drum is moved to bring the end of lever 183 upon the cam 185 thus returning the yarn tensioning parts to the position of Figure 21.

The fabric take-up is shown in Figures 1, 2 and 3 and comprises a frame 203 pivoted at 204 on a fixed part of the machine, said frame having a depending arm 205 resting on a cam 206 at the end of the pattern drum. The cam is provided with a high part for lifting the frame so as to take the tension off the fabric, a low part for holding the frame so as to exert a slight tension on the fabric and a part cut away to permit the take-up to act with full tension effect on the fabric (Fig. 2).

A wire 207 is suspended from the forward end of the frame as usual and said wire supports a variable number of weights 208 for changing the tension on the fabric. The frame is provided as usual with a pair of rollers 209 (Fig. 1), one of which is driven by a gear 210 mounted on the reduced end of the roller, this gear being driven in turn by another gear on the shaft of the roller which carries at its end a pulley 211 driven by a belt 212 from a pulley 213 on the shaft 102 hereinbefore described.

The machine of my invention is intended primarily for knitting stockings having ribbed legs and plain feet. In a characteristic operation of making such a stocking assuming that the parts are in position for beginning a stocking, which position is illustrated in Figures 1 to 5 and 21, the cylinder needles will now be knitting plain work for a sufficient number of courses to provide the margin allowed for looping after which the pattern drum through the lever 214 changes the movement of the machine from rotary to reciprocating. In the machine here illustrated a splicing yarn is tied in at this time though it may be knit in throughout the loopers' rounds or courses. Up to the time when reciprocation begins the lever 183 remains on the cam 184 to hold the take-up 189 in idle position (Fig. 21). The rod 178 is turned by the pattern mechanism as above explained to cause the the knot to be tied and the reinforcing yarn is thereby drawn into the fabric for strengthening the toe pocket. The toe pocket is narrowed and widened in ordinary manner well-known to those skilled in the art after which the machine again goes on rotary work in ordinary manner for knitting the foot. At this time the splicing yarn may be cut out if desired but preferably the splicing yarn continues to be knit into the fabric. The position of parts during reciprocation is shown in Figure 22. At the completion of the toe pocket the slack take-up 189 goes out of action, the lever 183 riding up on the cam 185 to move lever 187 into the position indicated in Fig. 23. At this time rod 178 returns to move the actuator cam 198 for the knotting elements into the position shown in Fig. 23 as in Mayo No. 726,229.

The machine now continues to knit through the foot until the reciprocating motion for the heel pocket has begun At this time lever 183 rides off cam 185 allowing the slack take-up arm 189 to come into action and at the same time rod 178 and actuator cam 198 are placed in the position shown in Fig. 22. The heel pocket is widened and narrowed in the same manner as the toe pocket. When the heel pocket is completed forward motion of the machine is resumed lever 183 rides upon cam 184 moving slack take-up arm 189 into the position shown in Fig. 23, and also placing rod 178 and actuator cam 198 again in the position shown in Fig. 23. The ankle portion is now knitted and may be of any varied length required for the various styles of stockings.

Prior to making the transfer from plain to rib knitting the cast-off cam 62 is actuated by bob-cam 81 to project the needles into the path of brushes 67 and 68 causing the latches to be opened. The splicing yarn is cut out at this time, the yarn-changing parts going from the position of Fig. 23 to that of Fig. 21. After the machine has revolved a predetermined number of revolutions for the purpose of opening these latches bob-cam 81 actuates the casting-off cam 62 in such a manner that the dial needles on the cast-off side will not be advanced and upon the following revolution bob-cam 81 will strike lug 79 causing the knitting cam 61 to project the dial needles to the half-way or tuck position. In this position they will receive their first course of yarn. When this revolution is complete bob-cam 81 will strike lever 78 causing the cam 61 to be moved inward whereupon cam 64 will retract the needles to their inward position where they will remain while the cylinder needles knit one or more courses of plain work. These plain courses are knitted for the purpose of closing up the large holes which would occur if the dial needles were brought from non-knitting directly to knitting position. When the desired number of plain courses is completed bob-cam 82 rises to strike lever 77 causing the knitting cam 61 to be brought into knitting position and will remain in this position until the entire plain rib portion of the stocking is completed.

It is desirable to place a welt or a number of welts upon the top of the stock, and for doing this there are a number of cams placed upon the pattern wheel with various heights upon them for the purpose of raising the bob-cam 81 to strike the different levers. The following description is of a tuck welt: First the bob-cam 81 rises to strike lug 80 for causing knitting cam 61 to be placed in the half-way position; the dial needles will then hold two courses of yarn without casting off; bob-cam 81 then strikes lever 77 causing knitting cam 61 to be brought to full knitting position again.

The following is a description of a round welt: Bob-cam 81 strikes lug 80 causing knitting cam 61 to be placed in the half-way or tuck position allowing dial needles to hold two courses of yarn without casting off; bob-cam 81 now strikes lever 78 placing knitting cam 61 in the all-the-way-in position allowing the cylinder needles to knit one or more courses of plain work as may be desired, the welt being made more conspicuous by increasing the number of courses; the bob-cam 81 then strikes lever 77 causing knitting cam 61 to come to the full knitting position. As many of these welts, either tuck or round, may be placed upon the stocking as is required. A predetermined number of rounds of plain rib work is now knit in order that the stocking may be hemmed at the top. This margin of plain rib allows for cutting the stockings apart and also provides enough fabric to prevent the welt being raveled out before hemming. This completes the stocking.

A similar sequence of operations for similar purposes is described in Perry Patents 1,661,085 and 1,696,282.

Fig. 24 is a development of the pattern drum on which figure there are indicated a cam groove and segmental cams, the figure being intended to develop the relation of the yarn-changing and yarn-tension-varying operations with reference to the knitting of the different parts of a stocking.

In Figures 25 to 30 I have shown a dial cam plate suitable for use in connection with any of the well-known types of dial and cylinder knitting machines but peculiarly adapted for use in machines of small diameter for knitting children's sizes. The particular merit of the cams in these figures is that they operate the needles freely without binding even in machine of small diameter and that they permit the use of a larger number of needles than can be used on an ordinary head of small size. In these figures reference character 220 indicates a disk or dial plate of hardened steel which is secured to the ordinary foundation portion 221 of a cam cap. This disk has located thereon a combined needle and guard cam 222 so formed as to cooperate with both of the projecting cams in the operation of knitting. The particular device 222 is an improvement on devices hitherto used for the same purpose and cooperates in a desirable manner with the other cams shown but retracting cams and guard cams of various forms, either separate or combined, may be arranged to cooperate with my improved needle-projecting cams for the purpose specified, and my improved guard and needle-projecting cams, if desired. The disk 220 is hardened to prevent the needle butts from cutting grooves in the disk thereby making the needles inoperable.

The needle projecting cams which are an important feature of my invention consist of two compound cams of which the one indicated at 223 may be the knitting cam and the other at 224 a clearing or cast-off cam for clearing the latches preparatory to casting off the work from the needles. Each of these cams is pivoted as indicated at 225 on a pivot extending through the disk 220 which disk may consist of two or more concentric disks fixed together or may be otherwise made up of several parts. Cams 226 are pivoted at 227 to the respective cams 223 and 224 forming jointed or "knuckle" cams. The connection between cams 223 or 224 and 226 may be made by means of tongues on cams 226 fitting in slots in the cams 223 and 224. The cams 226 have pins 228 projecting down into slots 229 in the disk 220.

The pivot 225 has secured thereto at the opposite (upper) side of disk 220 a rockarm 230 with an upwardly projecting pin 231 adapted to be connected to any suitable operating means for moving the needle-projecting cams to the various positions assumed by them in connection with different knitting operations.

It will be seen that as the cams 223 and 224 swing on their pivots cams 226 will be caused to move with them to a certain extent, the movement of the latter cams being, however, different from that of the first by reason of the pin and slot engagement between the cams 226 and disk 220. Difficulty has been found in the making of children's hosiery of the character above referred to in that the angle on the main swing cam when in projected position is so steep that the needles will not ride on it and this difficulty increases as the diameter of the dial (and consequently of the stocking) decreases. With the use of my two piece knuckle cam it will be seen in Figure 26 that the needle can be started out at a much earlier stage in its travel than when the ordinary one-piece cam is used thereby giving it a much less steep angle and enabling it to operate freely. With this improved cam it is also possible to use a larger number of needles in a given diameter than with the old style cam since a shorter needle can be used which will allow more slots to be cut in the dial than has heretofore been possible. The cam plate 222 in a preferred form of the invention has flat or low outer parts 232, 232, 232 bounded internally at 233, 233 by ridges (Fig. 28) the sides of which ridges merge at the ends to form sharp receding edges at 234, 234. An edge at 235 near the opening 236 for removal of damaged needles, also slopes off sharply and tapers toward a point. The ridges adjacent the edges 234 are broadened at the bottom to extend out to the margin of disk 220 and these edges serve to open fully any latches which are only partially open. This function is of use particularly at the casting off side where a brush is placed to open the latches preliminary to the beginning of knitting but often fails to open them fully whereupon the cam completes the operation. The one-piece cam 222 is desirable also in that it is less expensive to manufacture and assemble than those made in several pieces while the wear is less rapid owing to lack of joints and edges for foreign objects to catch on.

An annular disk 237 of spring steel lies between the needle-projecting cams and the dial needles as indicated in dotted lines in Figures 25 and 26, said disk having a central opening at 238. The disk is held in place by the dial post and this is true whether the machine be large or small. The utility of the disk or dial plate is not limited to knuckle cams but it is also useful in connection with dial cams of other varieties and in fact the principle may be used wherever there is danger of injury to the needle-butts by engagement thereof with blunt ends or knuckles of cams forming parts of the path for the needle-butts.

The disk 237, which I prefer to call a dial plate, has for its principal purpose to prevent the needles traveling too far in toward the dial cam post whereby the needle-butts might enter the openings or bays between the inside swing cams or the relatively movable parts of the cams and be sheared off. The outer diameter of this plate is such that the needles can be drawn in by the retracting cam far enough to knock over the dial stitches but not far enough to permit the needle-butts to enter the openings between the cams or parts of cams. The plate rests on top of the dial between the lower faces of the inside swing cams and the shanks of the dial needles. When all of the dial needles are retracted their shanks are underneath this plate. The use of a plate such as shown in Figure 29 (or an equivalent device) is not limited to cams of the specific type shown in the drawings, a device of this character being useful with dial cams of various conformation for the purpose of preventing needle-butts from entering irregularities or recesses in the inner wall of the needle-butt path and being damaged.

The knocking-over point on the needle-retracting dial cam is secured to the dial cam cap by a stud 239 (Figs. 14 and 31) fixed to the combined guard and retracting cam 222 said stud passing through a hole in the dial cam plate 220 and the dial cam cap 221 and being secured in adjusted position by a screw 240 entering a threaded socket in the stud. The knocking-over point is adjustable inwardly against the force of the resilient cam 222 by a screw 241 in the edge of the dial cam cap. Ordinarily the point of the casting-off cam is set in such a position that the dial needles will be held out by the cam just far enough to prevent knocking-over of their loops. In setting up the machine the knocking over point may be forced in as far as may be required for casting-off the loops of various size yarns, it being understood that the casting-off point must be pressed in farther for heavy yarn than for a lighter yarn, and that the resiliency of the cam always tends to force it outward from the preferred adjusted position.

It will be obvious to those skilled in the art that various changes may be made in my device without departing from the spirit of the invention and therefore I do not limit myself to what is shown in the drawings and described in the specification but only as indicated in the appended claims.

Having thus fully described my said invention, what I claim as new and desire to secure by Letters Patent, is:

1. A knitting machine comprising a set of dial needles, a set of cylinder needles, means for supporting and actuating the needles, said means including a dial, a rotary dial cam cap, a needle projecting knitting cam and a needle projecting cast-off cam on the dial cam cap, a pattern mechanism for positioning said needle projecting cams said pattern mechanism including a pair of bob-cams on the stationary frame, and connections whereby one of the bob-cams operates on only one of said needle projecting cams while the other operates on both, substantially as set forth.

2. A knitting machine comprising a set of dial needles, a set of cylinder needles, means for supporting and actuating the needles including a dial, a rotary dial cam cap, a needle projecting knitting cam, a needle projecting cast-off cam on the dial cam cap, a pattern mechanism for positioning said needle projecting cams said pattern mechanism including a pair of bob-cams at opposite sides of the knitting head, and connections whereby one of the bob-cams operates on only one of said needle projecting cams while the other operates on both, substantially as set forth.

3. A knitting machine comprising a set of dial needles, a set of cylinder needles, means for supporting and actuating the needles said means including a dial, a rotary dial cam cap, a needle projecting knitting cam, a needle projecting cast-off cam on the dial cam cap, a pattern mechanism for positioning said needle projecting cams said pattern mechanism including a pair of bob-cams on the stationary frame, connections between the bob-cams and the needle projecting cams whereby one of the bob-cams operates on only one of said needle projecting cams while the other operates on both, a pattern wheel below the knitting head, and connections from the pattern wheel to both of said bob-cams, substantially as set forth.

4. In a knitting machine, a set of dial needles, a set of cylinder needles, means for supporting and actuating said needles said means including a dial, a dial cam cap, needle projecting cams at opposite sides of the dial cam cap, pattern mechanism for positioning the said cams said pattern mechanism including a pair of bob-cams, a pattern form below the knitting head having peripheral and lateral lugs, connections operable from the lateral lugs for actuating one bob-cam, connections from the peripheral lugs for actuating the other bob-cam, and means for driving the pattern form, substantially as set forth.

5. In a knitting machine, a set of dial needles, a set of cylinder needles, means for supporting and actuating said needles said means including a dial, a dial cam cap, needle projecting cams at opposite sides of the dial cam cap, pattern mechanism for positioning the said cams said pattern mechanism including a pair of bob-cams, a pattern form below the knitting head having peripheral and lateral lugs, means operable by the peripheral lugs for actuating one of the bob-cams, means operable by the lateral lugs for actuating the other bob-cam, means for driving the pattern form in timed relation with the knitting head said means comprising a continuously reciprocating pawl, an auxiliary pawl, a main cam shaft, and means on the main cam shaft for actuating the auxiliary pawl to supplement the action of the first-named pawl, substantially as set forth.

6. A knitting machine comprising a set of dial needles, a set of cylinder needles, means for supporting and actuating the needles including a dial, a dial cam cap, oppositely located needle projecting cams on the cam cap, pattern mechanism for controlling the needles to produce ribbed, plain circular or reciprocating knitting said pattern mechanism including a main cam shaft, a pair of bob-cams, a pattern form, connections between the bob-cams and the pattern form, a take-up for the fabric including a horizontal shaft geared to the main cam shaft, connections from the horizontal shaft to the pattern form for driving the same, means for interrupting the action of said last-named connections, means operated from the main cam shaft for re-starting the pattern form, and means operated from said cam shaft for intermittently interrupting the operation of the take-up, substantially as set forth.

In witness whereof, I have hereunto set my hand at Washington, District of Columbia, this 25th day of April, A. D. nineteen hundred and twenty-five.

WILLIAM LEE SMITH, Jr.